3,002,869
GLASS FIBRE PREFORMS
Robert R. Hough and Roland Barone, Middlebury, Conn., assignors to United States Rubber Company, New York, N.Y., a corporation of New Jersey
No Drawing. Filed Mar. 12, 1957, Ser. No. 645,395
4 Claims. (Cl. 154—43)

This invention relates to improvements in the production of reinforced glass fibre mats and so-called preforms which are prepared preliminary to the actual resin-impregnation operation and final curing operation for making glass fibre reinforced plastic molded parts, and is concerned more especially with those final products in which an ethylenic cross-linked (during cure) polyester resin is used as the principal resin that is reinforced by the glass fibres.

In the glass fibre-reinforced plastics industry it is customary, when random glass fibres are used as the reinforcement, in a mat or preform, to bond the fibres together in the mat or preform, with a so-called pre-impregnating chemical binder. Since the glass fibres do not felt, some resinous binder or alternative is required, so that the mat or preform can be subsequently handled and tailored. The binder can be applied in the form of either a liquid or a powder. Subsequent molding operations usually dictate the choice, whether by matched-die-molding or other techniques.

The chemical binder resin preliminarily used in the mat or preform retains the fibres in the desired orientation, so that later a desired resin, namely, one now and most widely used being a polyester together with a cross-linker such as styrene, vinyltoluene, alpha-methylstyrene, diallyl phthalate, triallyl cyanurate, the diallyl ester of carbic anhydride, methyl methacrylate, and mixtures of these monomers, is forced into and throughout the prepared mat or preform containing said chemical binder, during the subsequent molding and curing operations.

In other words, the mat or preform, after being preliminarily treated with the chemical binder, has less than its full complement of resin that is necessary for the finished article, and the physical condition of the mat or preform is such as to render it open to later impregnation with the strength-imparting polymerizable polyester resin mixture, after which the whole is molded and cured-up as desired.

During the drying and curing cycle the binders currently in use, to bind the fibres of the mat or preform, exhibit extensive discoloration due to thermal instability. The discoloration of emulsion binders has limited their usefulness in the reinforced plastics industry, being especially so in decoration applications where color or translucency is important. This applies also to the polyester resins, even though they be used as the chemical binder in the form of aqueous emulsions, using generally nonionic emulsifiers such as Emulphor EL 719 (Antara), a polyoxyethylated vegetable oil, and an organic peroxy or hydroperoxy catalyst of which benzoyl peroxide and cumene hydroperoxide are typical. The aforesaid discoloration is not characteristic of either the polyester or the nonionic emulsifier, because heated separately they do not discolor. Discoloration is apparently caused through an interaction of the two ingredients. It was found that improvement could not be appreciably brought about in the thermal instability of the conventional polyester binder by changing the emulsifier.

There being so many different kinds of other resins, phenolic, melamines, etc., it was not pre-ascertainable which ones would adequately serve as pre-impregnating resins with the emulsifier and water to satisfactorily provide, after drying, both the requirements of non-discoloration and adequate binding properties between the later-to-be-applied polyester resin mix and the glass fibre reinforcement.

Certain acrylic polymer emulsions, when used as a binder, show good thermal stability but provide poor bond to the reinforcing glass fibres and furthermore yield poor physical properties under wet or humid conditions.

It has now been found that the following formulation, in which the parts are by weight, provides a pre-impregnating resin binder and bond in the mat, and preform, which overcomes the aforesaid disadvantages of discoloration and satisfactorily additionally imparts excellent wet or dry physical properties to the final molded article, be it laminate or otherwise.

EXAMPLE 1

Formulation:                                    Parts
  Diallyl phthalate prepolymer [1] _____ 20–50, preferably 40.
  Diallyl phthalate monomer__ 70–40, preferably 50.
  Nonionic emulsifying agent [2] _ 5–10, preferably 10.

[1] Homopolymerized diallyl phthalate which is essentially a non-cross-linked linear polymer; it has some allylic unsaturation so that it can be cured.
[2] Any known synthetic nonionic emulsifying agent.

When ready for use, the operator adds any suitable catalyst (about 1 part) and water. The water is added slowly with vigorous agitation in sufficient quantity to provide an aqueous emulsion having about 40% solids and 60% water. The water disperses the oil to form a "water-in-oil" emulsion. Additional water is then added, whereupon the emulsion inverts or changes to an "oil-in-water" type emulsion. Water can be added to provide such an emulsion, which is suitable for spraying onto the glass fibre mat or preform, usually when the emulsion contains 5–10% solids. Usually the emulsion is sprayed together with chopped glass fibres onto a collecting screen.

The fibrous mat or preform containing the said phthalate resin binder is subjected to heat in a circulating oven, or otherwise, for about two or three minutes, at about 350° F., to effect a cure of the resinous binder and remove excess water. The finished glass fibre mat or preform normally consists of between 5 and 15% binder, by weight, after drying and curing.

Presently used preform binders darken during the period when they are subjected to heat to effect the cure; thus heating to 350° F. for two minutes gives a light brown color, and the color increases to dark brown if this temperature is maintained for 10 minutes. In contrast, the preform of this invention can be heated for 10 minutes at 350° F. without darkening sufficiently to detect visually.

One recent commercially available material has shown fair heat stability, but it gives relatively poor physical properties in the final molded article. In contrast, the preforms of this invention give molded articles which have good physical properties. This is shown in the table below:

*Physical test data on products made from glass preforms made with—*

|  | Binder of This Invention | Conventional Binder |
|---|---|---|
| Ultimate flexural strength, p.s.i. | 35,000 | 34,000 |
| Initial flexural modulus, p.s.i. | $20.0 \times 10^5$ | $19.2 \times 10^5$ |
| After 2 hour immersion in boiling water: |  |  |
|   Ultimate flexural strength, p.s.i. | 27,500 | 28,000 |
|   Initial flexural modulus, p.s.i. | $18.9 \times 10^5$ | $18.0 \times 10^5$ |

This shows that the product of this invention gives physical properties equal to conventional polyester binders; in contrast, at the same time color is greatly improved both in the preform and the final product using this invention.

Having thus described our invention, what we claim and desire to protect by Letters Patent is:

1. A fabricated glass fibre structure comprising a preform of loose randomly distributed glass fibres partially pre-impregnated with a resin to bind and orient said fibres, the pre-impregnating resin being a substantially dry thermoset in-situ deposit from a catalyzed oil-in-water emulsion comprising as the essential resin ingredients both homopolymerized diallyl phthalate linear prepolymer and diallyl phthalate monomer, the dry thermoset deposit constituting from about 5 to about 15% of the preform, the resulting partially impregnated structure being completely impregnated with a strength-imparting curable polyester-cross-linker resin of different character than said first-mentioned binder resin, the cross-linker in said polyester-cross-linker resin being selected from the group consisting of styrene, vinyltoluene, alpha-methylstyrene, diallyl phthalate, triallyl cyanurate, the diallyl ester of carbic anhydride, methyl methacrylate, and mixtures of these monomers, the latter resin being subsequently cured.

2. A structure as defined in claim 1 wherein said emulsion contains from 20 to 50 parts of a diallyl phthalate prepolymer consisting of homopolymerized diallyl phthalate which is essentially a curable non-cross-linked linear polymer having allylic unsaturation, correspondingly from 70 to 40 parts of diallyl phthalate monomer, and from 5 to 10 parts of a nonionic emulsifying agent, in admixture with a catalyst and water.

3. The process which comprises forming a random glass fibre mat partially impregnated with a composition comprising an emulsion of the oil-in-water type containing from 20 to 50 parts of a diallyl phthalate prepolymer consisting of homopolymerized diallyl phthalate which is essentially a curable non-cross-linked linear polymer having allylic unsaturation, correspondingly from 70 to 40 parts of diallyl phthalate monomer, and from 5 to 10 parts of a nonionic emulsifying agent, in admixture with a catalyst and water, heating the resulting mat to cure the resinous binder and remove excess water, the amount of said composition being such that the resulting mat contains 5–15% binder and is open and receptive to impregnation, subsequently impregnating the resulting mat with a strength-imparting curable polyester-cross-linker resin of different character than the binder contained therein, the cross-linker in said polyester-cross-linker resin being selected from the group consisting of styrene, vinyltoluene, alpha-methylstyrene, diallyl phthalate, triallyl cyanurate, the diallyl ester of carbic anhydride, methyl methacrylate, and mixtures of these monomers, and curing said last-named resin.

4. A fabricated glass fibre preform comprising a mass of loose randomly distributed glass fibres partially pre-impregnated with a resin to bind and orient said fibres, the pre-impregnating resin being a substantially dry thermoset in-situ deposit from an emulsion of the oil-in-water type containing from 20 to 50 parts of a diallyl phthalate prepolymer consisting of homopolymerized diallyl phthalate which is essentially a curable non-cross-linked linear polymer having allylic unsaturation, correspondingly from 70 to 40 parts of diallyl phthalate monomer, and from 5 to 10 parts of a nonionic emulsifying agent, in admixture with a catalyst and water, the amount of said deposit being equal to from 5 to 15% of said preform, the physical condition of said preform being such that it is open and receptive to subsequent impregnation with a strength-imparting curable polyester-cross-linker resin of different character than the binder contained in said preform, the cross-linker in said polyester-cross-linker resin being selected from the group consisting of styrene, vinyltoluene, alpha-methylstyrene, diallyl phthalate, triallyl cyanurate, the diallyl ester of carbic anhydride, methyl methacrylate, and mixtures of these monomers.

References Cited in the file of this patent

UNITED STATES PATENTS

| | | |
|---|---|---|
| 2,513,268 | Steinman | June 27, 1950 |
| 2,595,852 | Hopper | May 6, 1952 |
| 2,600,783 | Kropa | June 17, 1952 |
| 2,653,355 | Essman | Sept. 29, 1953 |
| 2,702,261 | Bacon et al. | Feb. 15, 1955 |
| 2,748,028 | Richardson | May 29, 1956 |
| 2,763,629 | Gottfurcht | Sept. 18, 1956 |
| 2,787,314 | Anderson | Apr. 2, 1957 |
| 2,855,373 | Guenther | Oct. 7, 1958 |
| 2,905,580 | Kreier | Sept. 22, 1959 |

FOREIGN PATENTS

| | | |
|---|---|---|
| 590,680 | Great Britain | July 25, 1947 |
| 458,647 | Canada | Aug. 2, 1949 |